United States Patent [19]
Sipilä

[11] Patent Number: 6,122,498
[45] Date of Patent: Sep. 19, 2000

[54] DATA TRANSMISSION METHOD

[75] Inventor: Tuomo Sipilä, Helsinki, Finland

[73] Assignee: Nokia Mobile Phones, Ltd., Espoo, Finland

[21] Appl. No.: 08/849,504

[22] PCT Filed: Dec. 11, 1995

[86] PCT No.: PCT/FI95/00674

§ 371 Date: Aug. 6, 1997

§ 102(e) Date: Aug. 6, 1997

[87] PCT Pub. No.: WO96/19065

PCT Pub. Date: Jun. 20, 1996

[30] Foreign Application Priority Data

Dec. 12, 1994 [FI] Finland ..................... 945844

[51] Int. Cl.⁷ ................... H04Q 7/20
[52] U.S. Cl. ............ 455/403; 455/462; 455/557; 455/465; 455/74.1
[58] Field of Search ............. 455/462, 66, 557, 455/575, 347, 348, 349, 351, 422, 403, 465, 74.1; 375/222

[56] References Cited

U.S. PATENT DOCUMENTS 5,175,758  12/1992  Levanto et al. ............... 379/57
5,311,571  5/1994  Picket ........................ 455/222
5,412,650  5/1995  Davies ........................ 370/82
5,550,820  8/1996  Baran ......................... 370/395
5,628,055  5/1997  Stein ......................... 455/575

*Primary Examiner*—Daniel S. Hunter
*Assistant Examiner*—Yemane Woldetatios
*Attorney, Agent, or Firm*—Perman & Green, LLP

[57] ABSTRACT

The invention relates to a method for cordlessly connecting a data terminal to a data transmission network using the DECT telecommunications system. In the method of the invention, the portable radio part (PP) and fixed radio part (FP) insert signalling information according to the V.24, for example, in frames complying with the DECT protocol to be radio transmitted via the air interface. When using signalling internal to the data channel it is advantageous to use an auxiliary protocol complying e.g. with the V.110 standard. Local signalling can also be used, in which case the data channel need not be used for signalling during data transmission. The method can also be used to transfer the automatic call setup commands according to the V.25bis standard. The method of the invention facilitates a short-range cordless data connection which is compatible with other DECT applications and which can use advantageous DECT system components.

24 Claims, 4 Drawing Sheets

DATA TRANSMISSION METHOD

BACKGROUND OF THE INVENTION

The present invention relates to a method for cordlessly connecting data terminal equipment to a data transmission network via the DECT telecommunications system.

It is a known method to connect data terminal equipment to a public fixed telephone network via a modem. Then the interface between the data terminal equipment and the modem complies with the CCITT standard V.24, for example. However, there is in sight a growing need to transmit data between mobile data terminal equipment and a data transmission network, which requires a cordless interface.

Wireless mobile telephone systems, like the NMT and GSM, are used mainly to transmit speech. These systems are long range telecommunications networks. In addition to the speech connection, these networks also provide methods for the transmission of digital data and for wireless connection of data terminal equipment to a telecommunications network.

The above systems operate in a wide area and, because of the long range, the number of radio channels available is very limited. Since a modem connection usually uses a lot of connection time, it is unreasonably expensive to reserve a radio channel for that purpose. On the other hand, inside a building the operating range is short.

There are wireless modems and cordless LANs for the transmission of data inside buildings. However, these systems have high equipment costs and they are in-compatible with other systems using wireless data transmission. There are also cordless telephone systems and paging systems for the transmission of data inside buildings but a wireless connection of data terminal equipment to these systems is not possible.

For local wireless communication there is the digital European cordless telecommunications (DECT) system which provides advantageous data transmission means for the implementation of calls or paging. A disadvantage of the system is, however, that it does not allow the connection of data terminal equipment/modem.

It is an object of the present invention to provide a method and system for connecting data terminal equipment to a fixed communication network via the cordless DECT system. The method of the invention is characterized in that, in the transmitting radio part (PP, FP), the information transmitted between the portable (PP) and fixed (FP) radio parts is inserted wholly or partly in frames of a protocol complying, in whole or in part, with the DECT standard and, in the receiving radio part (FP, PP), the information is read from said frames.

BRIEF DESCRIPTION OF THE DRAWING

The invention is illustrated by describing embodiments of the invention with reference to the enclosed drawings, where.

DETAILED DESCRIPTION OF THE INVENTION

In the Figures and description, the following abbreviations are used:

DTE Data terminal equipment
DCE Data circuit terminating equipment, modem
PP Portable radio part
FP Fixed radio part
PSTN Public switched telephone network Terms related to the standards are defined below:

Data terminal equipment and a modem communicate via an interface according to the generally known CCITT V.24 standard. The interface is described in the CCITT Recommendation V.24: List of definitions for interchange circuits between data terminal equipment (DTE) and data circuit terminating equipment (DCE), CCITT Blue Book, Vol. VIII. 1, ITU, Geneva (1989), pp. 104 to 121.

According to the standard, the following signals are transmitted between a DTE and a modem:

| | |
|---|---|
| 105 | Request to send (RTS) |
| 106 | Clear to send (CTS) |
| 107 | Data set ready (DRS) |
| 108 | Data terminal ready (DTR) |
| 109 | Carrier detect (CD) |

In addition, a BREAK signal is needed in asynchronous transmission between a DTE and modem. For the data flow control it is also possible to use XON/XOFF messages transmitted on the data channel.

Modems often use automatic call setup according to the CCITT V.25bis standard. This function is described in the CCITT Recommendation V.25bis: Automatic calling and/or answering equipment parallel on the general switched telephone network (GSTN) using the 100-series interchange circuits, CCITT Blue Book, Vol. VIII, 1, ITU, Geneva (1989), pp. 121 to 153.

The following commands between a DTE and modem are related to the above standard:

| | |
|---|---|
| {CRN} | Dial number |
| {CRI} | Dial short number |
| {VAL} | Valid command |
| {INV} | Invalid command |
| {CFI} | Call failed |
| {INC} | Incoming call |
| {DIC} | Disregard incoming call |
| {CIC} | Connect incoming call |

The cordless telecommunication system DECT is described in the European Telecommunication Standard ETS 300 175-1-9: Radio Equipment and Systems (RES); Digital European Cordless Telecommunications (DECT) Common Interface, European Telecommunications Standards Institute, 1992.

The following abbreviations are related to the DECT system:

MAC Medium access control layer
IWU Interworking Unit
LAPU DECT user plane LAP protocol
C plane Control plane of the data transmission protocol
U User plane of the data transmission protocol
A/B Data profile using the LU2 service of the DECT DLC layer
C profile Data profile using the LU3 service of the DECT DLC layer
Messages in the DECT system:

| {CC-SERVICE-CHANGE} | Call service change |
|---|---|
| {CC-SETUP} | Call setup |
| {CC-CONNECT} | Call connect |
| {CC-RELEASE} | Call release |
| {CC-RELEASE-COM} | Call released |

Figure 1:
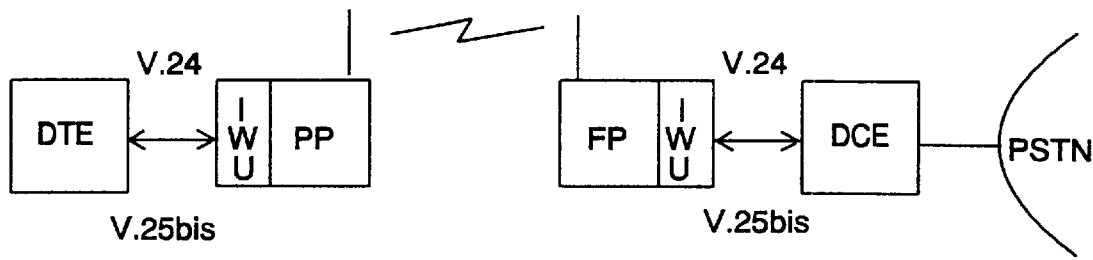
FIG. 1 shows a general signalling chart according to the invention.

FIG. 1 shows in a generalized manner a typical signalling chart according to the invention. The interface between data terminal equipment DTE and a portable radio part PP as well as between data circuit terminating equipment DCE and a fixed radio part FP complies with the V.24 and V.25bis standards. In the portable and fixed radio parts this interface is located in the interworking unit IWU. For cordless transmission the fixed and portable radio parts insert said signalling information and call setup commands in frames according to the DECT protocol, and in connection with the reception they read said information from the frames.

Signalling information can be transferred using internal signalling in the data channel or using primarily external/local signalling. When using internal signalling, it is advantageous to use an auxiliary protocol, particularly the CCITT V.110, GSM L2COP/L2BOP or SP-2812-A protocols. Below it is illustrated in an exemplary fashion the signalling with each of said auxiliary protocols as well as the external/local signalling. In addition, the transfer of automatic call setup commands is illustrated when using V.25bis commands.

CCITT V. 110

Figure 2:
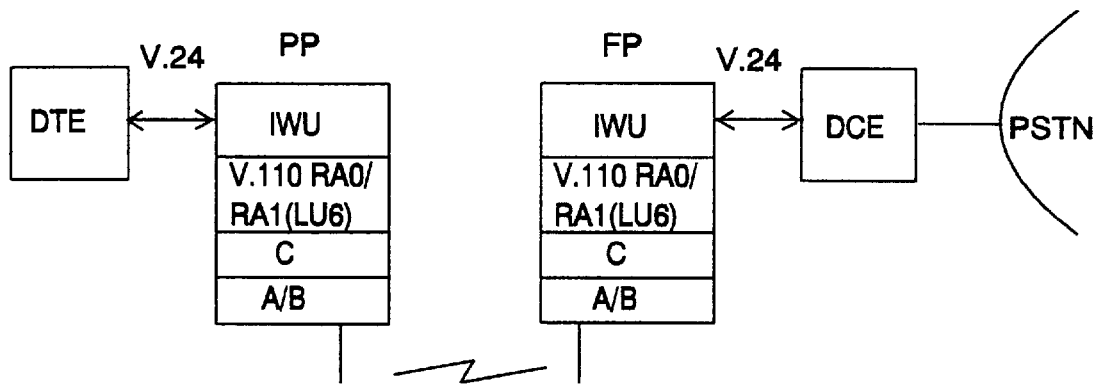
FIG. 2 shows a signalling chart according to the invention when using in-band signalling according to the CCITT V.110 standard.

The CCITT V. 110 uses special bit combinations inside the V.110 frames to indicate status changes in the V.24 circuits 105, 106, 107, 108, and 109, as well as for data flow control and BREAK signalling. According to the inventive method, the V.110 frames can be inserted in the C profile LAPU frames and carried across the air interface. This requires that the V.110 RA0 and RA1 rate adaptation functions be included in the FP and PP units. These functions can be implemented with the DECT LU6 service. A protocol model is shown in FIG. 2.

This embodiment is advantageous, considering the interworking with the GSM and ISDN networks, since both the GSM and ISDN use V.110 frames for connecting to data terminal equipment complying with the V standards.

The recommendation for the CCITT V.110 standard is presented in the CCITT Recommendation V.110: (09-92) Data Communication over the Telephone Network fEB. 1993, 58 pp. Support of Data Terminal Equipments (DTEs) with V-series Type Interfaces by an Integrated Services Digital Network (ISDN).

GSM L2BOP/L2COP

Figure 3:
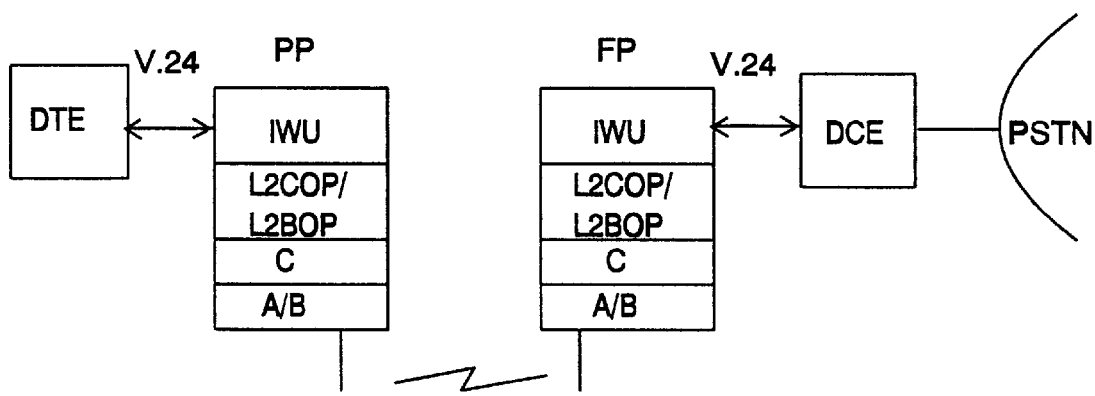
FIG. 3 shows a signalling chart according to the invention when using signalling according to the GSM L2COP/L2BOP standard.

In the GSM non-transparent (NT) bearer services the V.24 circuit information and the BREAK signal are transferred in the L2BOP/L2COP protocol layer. The signalling information is transferred inband. These protocol frames are inserted into the GSM RLP frames and transmitted via the air interface. With the DECT system they can be used in connection with the C data profile. This is easy to implement since both the RLP and LAPU are LAP protocols. The protocol model is shown in FIG. 3.

When using the above method the interworking with the GSM bearer services is naturally straightforward. Interworking with the ISDN is simple, too, since the coding of the L2 signalling information is based on the V.110 coding.

The recommendations for L2BOP and L2COP are presented in GSM 07.02 Terminal Adaptation Functions (TAF) for Services Using Asynchronous Bearer Capabilities and GSM 07.03 Terminal Adaptation Functions (TAF) for Services Using Synchronous Bearer Capabilities.

SP-28 12-A

Figure 4:
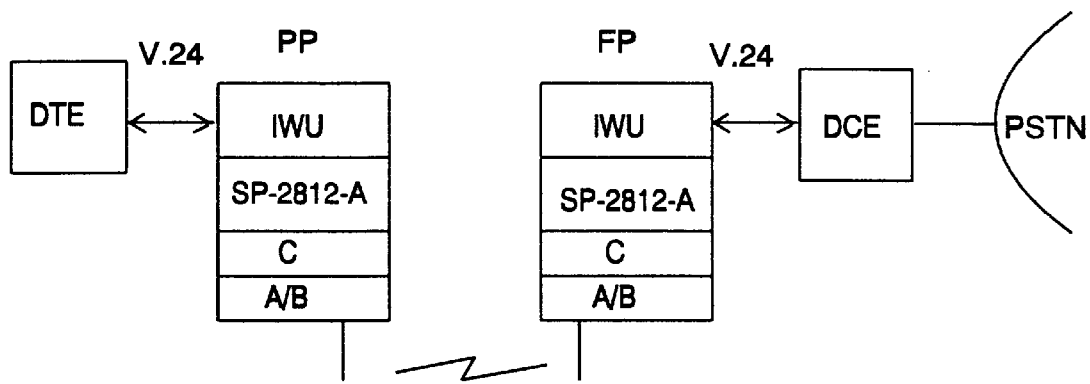
FIG. 4 shows a signalling chart according to the invention when using signalling according to the SP-28 12-A standard.

This protocol uses escape sequences in the user data flow to indicate status changes during the data transmission. The advantage of the SP-2812-A protocol is that it also provides the possibility to transfer status information for other than the most important signals. A disadvantage is that the SP-2812-A is suitable primarily for character-oriented transfers. The protocol model is shown in FIG. 4.

Local signalling

The data flow control is carried out separately between a DTE and PP, a PP and FP, and a DCE and FP. End-to-end flow control is not needed since each interface operates independently, ie. if the buffers of a DTE are fill it turns on signal 133 (105) to prevent the PP from transmitting data on 104.

When the PP has suspended the data flow on 104 its receive buffers will fill up after a period of time and it has to signal the FP to limit the information flow. Again, the FP has to ask the DCE to temporarily suspend the data transmission. The data flow is controlled in the same way also in the opposite direction, ie. a DCE uses circuit 106, etc.

The XON/XOFF flow control can be used end-to-end using U plane data or in the same manner as 106/133 flow control.

Figure 5:
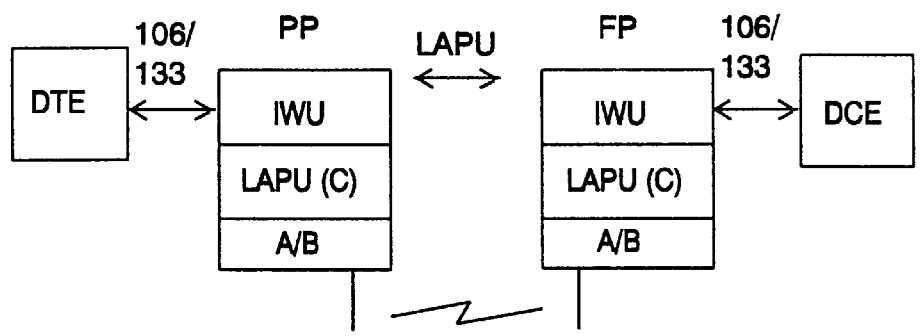
FIG. 5 shows a signalling chart according to the invention when using local control.

The data flow control is illustrated in FIG. 5.

Figure 6:
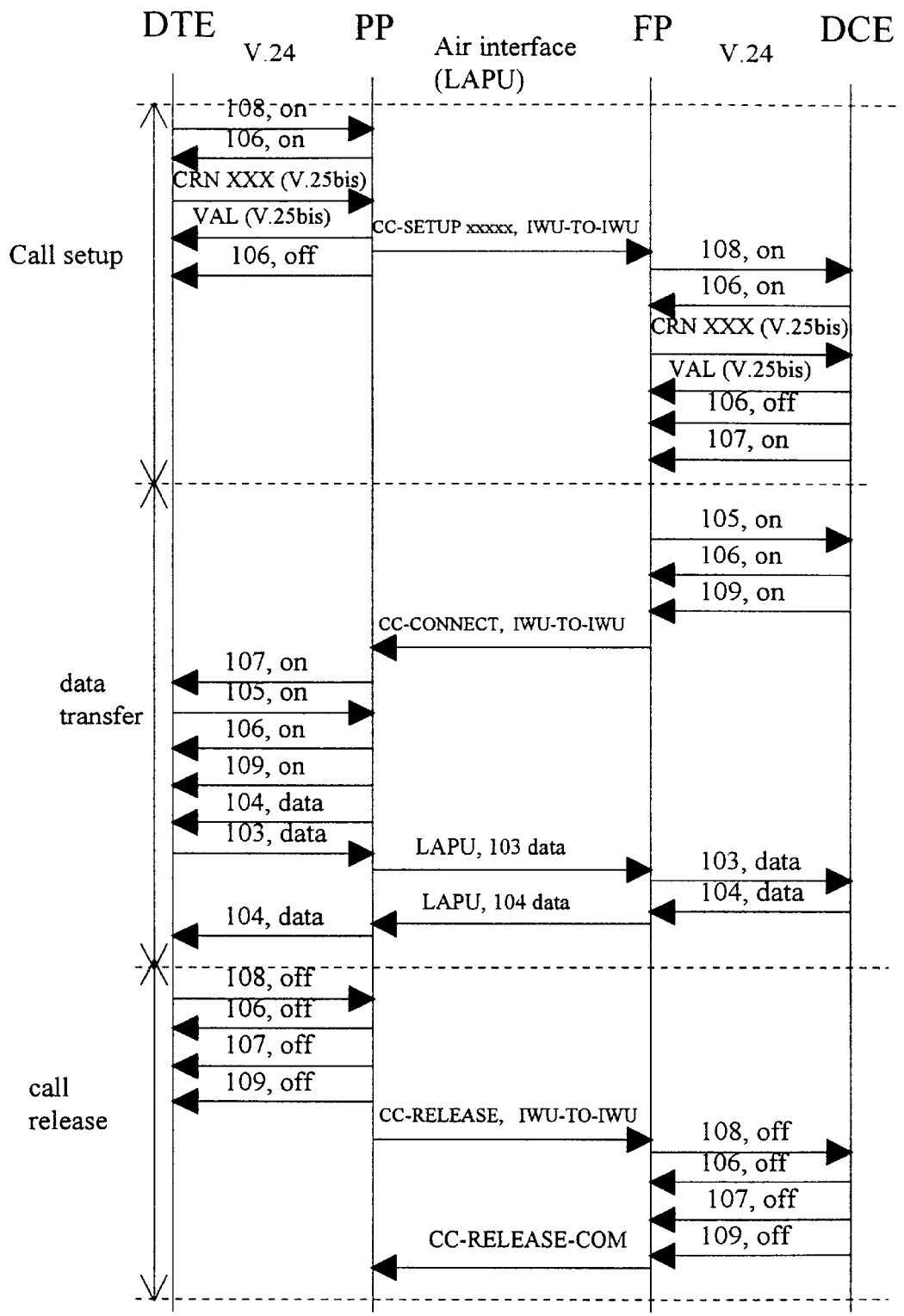
FIG. 6 shows a signalling chart according to the invention when using V.25bis call setup and full duplex transmission.
Figure 7:
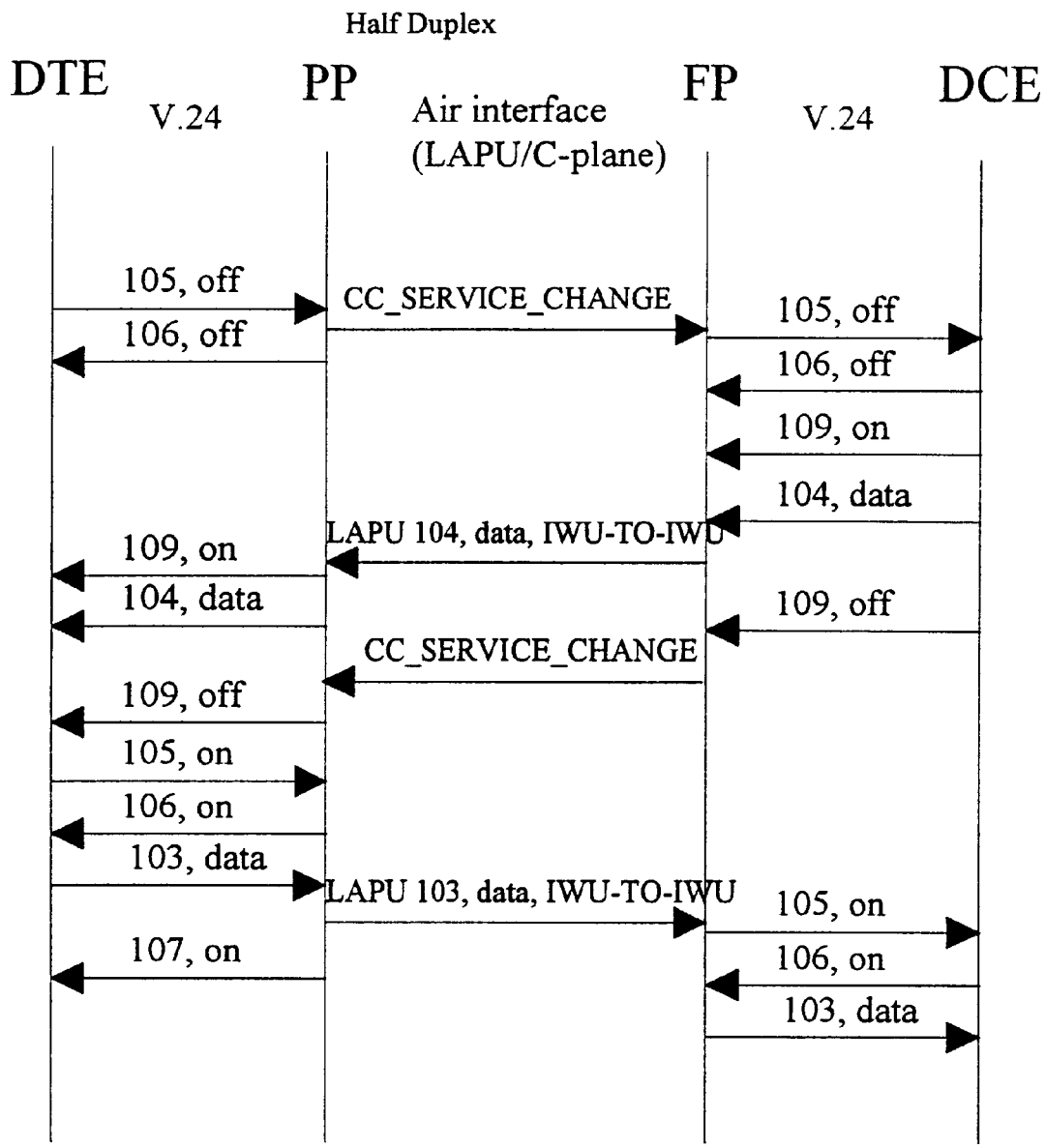
FIG. 7 shows a signalling chart according to the invention when using half duplex transmission.

When using local control the arrangement of signalling depends on whether fall duplex or half duplex transmission is used. In the half duplex, or simplex, transmission, one channel is used alternately in both directions. FIG. 6 shows a signalling chart according to full duplex transmission, and FIG. 7 shows a signalling chart according to half duplex transmission.

1. Full duplex transmission

When fall duplex is used the states of the signalling circuits do not change during normal data transmission. Circuits 106 and 133 (105) are locally controlled at both ends and the C profile LAPU layer is used between the radio parts. States of circuits 107, 108, and 109 are also handled locally. End-to-end control can be used if necessary. The necessary information, such as the BREAK signal and the initial states of the circuits are transmitted end-to-end.

The signalling information of circuits 105, 106, 107, 108, and 109 are transferred only in connection with the call setup and release or in an error situation in C plane messages using, for example, IWU-TO-IWU information elements and special coding. It is also possible to transfer the signalling information during the data transmission using C plane messages. Thus it is possible to transfer all the information on unexpected situations.

The C channels of the DECT MAC layer can be used to transfer status information. This means that the V.24 status can be transmitted in all call control C plane messages. With the Cs channel (slow control channel) in use, the information can be transmitted at best in 60 ms, and with the Cf channel (fast control channel) much faster. However, use of the Cf channel reduces the capacity of the U plane. If the Cf channel is used, the unexpected situation information can be transmitted almost immediately since the Cf channel overrides the U plane data transmission and uses the data channel to transfer the signalling information.

Contrary to the above embodiments, this alternative provides a way to avoid continuous transmission of V.24 information on the user plane data channel.

2. Half duplex transmission

With the half duplex in use, circuits 105, 106, and 109 are used to control the transmission direction change. The V.24 request for change of transmission direction results in a CC-SERVICE-CHANGE message containing an indication for direction change. The following rules are applicable here:

As a PP receives from a data terminal DTE a circuit 105 change from ON to OFF it sends a {CC-SERVICE-CHANGE} message to the FP and sets circuit 106 to OFF state.

As the FP receives the {CC-SERVICE-CHANGE} message it sets circuit 105 to OFF state.

As the data circuit terminating equipment DCE changes the status of circuit 109 to OFF the FP sends a {CC-SERVICE-CHANGE} message to the PP.

As the PP receives the {CC-SERVICE-CHANGE} message it sets circuit 109 towards the DTE to OFF state.

As the PP detects incoming data from the U plane it sets circuit 109 to ON and sends the data to circuit 104.

As the FP detects incoming data from the U plane it sets circuit 105 to ON and waits for circuit 106 to turn ON before sending the data with circuit 103.

The advantage of this functionality is that the transmission capacity of the radio interface can be fully utilized by one way link without leaving the opposite direction channel unused during the one way transmission.

An example of half duplex signalling according to above rules is shown in FIG. 7.

V.25bis automatic call setup

A DTE can use the serial modem call control V.25bis information to initiate a call setup in a DCE. In the DECT, the V.25bis commands have to be transferred via the air interface. According to the invention, this can be done e.g. by using an existing DECT call control message or transferring the V.25bis commands transparently using IWU-TO-IWU packets, for example.

The signalling between a DTE and PP using the V.24 interface in the case of automatic call setup complies with the CCITT V.25bis recommendation. Another alternative is to initiate the call setup using the keypad of the PP.

Now follows a proposal for converting V.25bis control messages into DECT connection control messages.

1. PP originated calls

A call setup request from a DTE to PP by keypad or through V.25bis {CRN}, {CRI} or {CRS} commands initiates the sending of a {CC-SETUP} message. The mapping of information elements related to alternative call initiators is shown in Table 1. In the case of a serial modem control connection (V.25bis) the PP IWU acknowledges the DTE with an appropriate answer, ie. responding to the commands is carried out locally. Between the DTE and PP, the {VAL} and {LNV} indications are used locally, ie. if a V.25bis command is invalid the PP will answer with {INV} and will not proceed with call setup. The acceptance of a command is acknowledged with (VAL). After these messages, circuit 106 is switched OFF.

If the call is accepted the FP sends a (CC-CONNECT) message to the PP. In this case, the PP will turn circuit 107 ON to indicate successful call setup. After that, the normal data transfer phase may begin.

The above call setup phase is illustrated by the signalling chart in FIG. 6.

If the call is not accepted the FP sends a {CC-RELEASE-COM} reply to the {CC-SETUP} message accompanied by a release reason code. As the PP receives the message it sends to the DTE the V.25bis {CFI} message accompanied by the error code information. The information element mapping between the keypad and V.25bis is shown in Table 2.

The call release is done by the DTE by switching circuit 108/2 OFF whereupon the PP will send a (CC-RELEASE) message to the FP.

TABLE 1

| Item no. | PP user | V.25bis message | DECT message | Note |
|---|---|---|---|---|
| | Keypad | {CRN} {CRI} {CRS} | {CC-SETUP} | Call initiate |
| 1 | Call number | Dialled number | Called party number | |
| 2 | — | Identification number | Called party sub-address | |
| 3 | Derived from internal settings | Derived from internal settings | IWU attributes (information element) | |
| 4 | Derived from internal settings | Derived from internal settings | End-to-end compatibility (inf. element) | |

TABLE 2

| Item no. | PP user | V.25bis message | DECT message | Note |
|---|---|---|---|---|
| | Display | {CFI} | {CC-RELEASE-COM} | Call terminate |
| 1 | Error cause | Failure type | Release reason | |

2. PP terminated calls

The PP terminated calls are initiated by an incoming {CC-SETUP} message. When the message is received, the V.25bis {INC} indication is sent and/or the PP switches circuit 125 ON or the information is displayed on the PP display. The mapping between the setup message, V.25bis messages and the display is shown in Table 3.

TABLE 3

| Item no. | PP user | V.25bis message | DECT message | Note |
|---|---|---|---|---|
| | | {INC} | {CC-SETUP} | Incoming call |
| 1 | Display | | Called party number | |
| 2 | Display | | Called party sub-address | |

TABLE 3-continued

| Item no. | PP user | V.25bis message | DECT message | Note |
|---|---|---|---|---|
| 3 | Display | | IWU attributes (information element) | |
| 4 | Display | | End-to-end compatibility (inf. element) | |

When an {INC} call indication about an incoming call is received, the DTE may answer either with a {DIC} or with a {CIC} command. With the {DIC} command, the call will be rejected and a {CC-RELEASE-COM} will be sent with the code hex15"user rejection""<<release reason>> as a response to the {CC-SETUP} message. With the {CIC} command, the call setup procedure continues normally.

The procedures in a DTE originated call disconnection are the same as in PP originated situations. If the call is to be disconnected by the opposite end, the FP sends the V.25bis message {CFI} with the error code from the <<release reason>> information element.

The above description illustrates some embodiments of the invention. Naturally, the principle according to the invention can be modified, regarding, for example, functional details and fields of application, within the scope of the invention defined by the claims set forth below.

Details of devices related to the use of the method of the invention are not explained in this description since they are generally known to a person skilled in the art.

What is claimed is:

1. A method for cordlessly connecting data terminal equipment (DTE) to data circuit terminating equipment (DCE) connected to a telecommunications network, in which a portable radio part (PP) is connected to the data terminal equipment (DTE) and a fixed radio part (FP) is connected to the data circuit terminating equipment (DCE) and in which data and signaling information and information related to automatic call setup are transmitted between the data terminal equipment (DTE) and portable radio part (PP) as well as between the data circuit terminating equipment (DCE) and fixed radio part (FP), wherein, in the transmitting radio part (PP, FP), the information transmitted between the portable (PP) and fixed (FP) radio parts is inserted wholly or partly in frames of a protocol complying, in whole or in part, with the DECT standard and, in the receiving radio part (FP, PP), the information is read from said frames;
   wherein the method further comprises steps of inserting, in the transmitting radio part (PP, FP), the signaling information in frames of an auxiliary protocol which are further inserted in above-mentioned frames of the protocol complying with the DECT standard and, in the receiving radio part, and reading the frames of the auxiliary protocol from the received frames complying with the DECT standard and the signaling information is read from the frames of the auxiliary protocol.

2. The method of claim 1, characterized in that between data terminal equipment (DTE) and a portable radio part (PP) and between data circuit terminating equipment (DCE) and a fixed radio part (FP) the signalling information is transmitted wholly or partially according to the CCITT V.24 standard.

3. The method of claim 1, characterized in that in the transmitting radio part (PP, FP), the signalling information is inserted in frames of an auxiliary protocol which are further inserted in above-mentioned frames of the protocol complying with the DECT standard and, in the receiving radio part, the frames of the auxiliary protocol are read from the received frames complying with the DECT standard and the signalling information is read from the frames of the auxiliary protocol.

4. The method of claim 1, characterized in that said signalling information is transferred between the portable radio part (PP) and fixed radio part (FP) in the DECT user plane frames using internal signalling in the data channel.

5. The method of claim 1, characterized in that the signalling information is transferred between the portable radio part (PP) and fixed radio part (FP) in the DECT user plane C profile LAPU frames.

6. The method of claim 1, characterized in that the auxiliary protocol used is a protocol complying with the CCITT V.110 standard.

7. The method of claim 6, characterized in that the RA0 and RA1 rate adaptation according to the CCITT V.110 standard is carried out in the portable radio part (PP) and fixed radio part (FP).

8. The method of claim 7, characterized in that the RA0 and RA1 rate adaptation is carried out using the DECT LU6 service.

9. The method of claim 2, characterized in that the auxiliary protocol used is a protocol complying with the GSM L2BOP/L2COP standard.

10. The method of claim 2, characterized in that the auxiliary protocol used is a protocol complying with the SP-2812-A standard.

11. The method of claim 3, characterized in that the fixed radio part (FP) is essentially connected to a communication system complying with the GSM standard and the data circuit terminating equipment (DCE) is located in a GSM network (MSC) and an auxiliary protocol is used to transfer the signaling between the systems.

12. The method of claim 1, characterized in that the fixed radio part (FPP) is essentially connected to a communication system complying with the ISDN standard and the data circuit terminating equipment (DCE) is located in an ISDN network and an auxiliary protocol is used to transfer the signalling between the systems.

13. The method of claim 1, characterized in that the end-to-end signalling information between the data terminal equipment (DTE) and data circuit terminating equipment (DCE) is transferred between the portable (PP) and fixed (FP) radio part in the DECT control plane frames using signalling external to the data channel.

14. The method of claim 13, characterized in that the data transmission is carried out in the full duplex mode.

15. The method of claim 2, characterized in that the flow control 106 and 133 (105) complying with the V.24 standard is carried out locally between the data terminal equipment (QTE) and portable radio part (PP) as well as between the data circuit terminating equipment (DCE) and fixed radio part (FP), and the C profile LAPU control is used between the radio parts.

16. The method of claim 2, characterized in that the signalling information 105, 106, 107, 108, 109 complying with the V.24 standard is transmitted across the air interface in connection with the call setup and release.

17. The method of claim 13, characterized in that the data transmission is carried out in the half duplex mode.

18. A method for cordlessly connecting data terminal equipment (DTE) to data circuit terminating equipment (DCE) connected to a telecommunications network, in which a portable radio part (PP) is connected to the data terminal equipment (DTE) and a fixed radio part (FP) is connected to the data circuit terminating equipment (DCE) and in which data and signaling information and information related to automatic call setup are transmitted between the data terminal equipment (DTE) and portable radio part (PP) as well as between the data circuit terminating equipment (DCE) and fixed radio part (FP), characterized in that, in the transmitting radio part (PP, FP), the information transmitted between the portable (PP) and fixed (FP) radio parts is inserted wholly or partly in frames of a protocol complying, in whole or in part, with the DECT standard and, in the receiving radio part (FP, PP), the information is read from said frames;

wherein the method further comprises steps of transmitting the signaling information, between data terminal equipment (DTE) and the portable radio part (PP) and between data circuit terminating equipment (DCE) and the fixed radio part (FP), wholly or partially according to the CCITT V.24 standard; and wherein one or more of the following rules are applied in the communication:

As the portable radio part (PP) receives from data terminal equipment (DTE) information about circuit 105 change from ON to OFF it sends a {CC-SERVICE-CHANGE} message to the fixed radio part (FP) and sets circuit 106 to OFF state.

As the fixed radio part (FP) receives the {CC-SERVICE-CHANGE} message it sets circuit 105 to OFF state.

As the data circuit terminating equipment (DCE) changes the status of circuit 109 to OFF the fixed radio part (FP) sends a {CC-SERVICE-CHANGE} message to the portable radio part (PP).

As the PP receives the {CC-SERVICE-CHANGE} message it sets circuit 109 towards the data terminal to OFF state.

As the portable radio part (PP) detects incoming data on the user plane it sets circuit 109 to ON and sends the data to circuit 104.

As the fixed radio part (FP) detects incoming data from the user plane it sets circuit 105 to ON and waits for circuit 106 to turn ON before sending the data with circuit 103.

19. The method of claim 1, characterized in that the automatic call setup commands are transferred between the PP and FP as DECT connection control messages.

20. The method of claim 1, characterized in that the automatic call setup commands are transferred between the PP and FP transparently.

21. The method of claim 19, characterized in that said automatic call setup commands between the data terminal equipment (DTE) and portable radio part (PP) and between the data circuit terminating equipment (DCE) and fixed radio part (FP) comply wholly or partially with the CCITT V.25bis standard.

22. The method of claim 19, characterized in that said commands between the data terminal equipment (DTE) and portable radio part (PP) and between the data circuit terminating equipment (DCE) and fixed radio part (FP) comply wholly or partially with the AT HAYES standard.

23. A method for cordlessly connecting data terminal equipment (DTE) to data circuit terminating equipment (DCE) connected to a telecommunications network, in which a portable radio part (PP) is connected to the data terminal equipment (DTE) and a fixed radio part (FP) is connected to the data circuit terminating equipment (DCE) and in which data and signaling information and information related to automatic call setup are transmitted between the data terminal equipment (DTE) and portable radio part (PP) as well as between the data circuit terminating equipment (DCE) and fixed radio part (FP), wherein, in the transmitting radio part (PP, FP), the information transmitted between the portable (PP) and fixed (FP) radio-parts is inserted in frames of the DLC or higher level protocol) complying, in whole or in part, with the DECT standard and, in the receiving radio part (FP, PP), the information is read from said frames;

wherein the method further comprises steps of inserting, in the transmitting radio part (PP, FP), the signaling information in frames of an auxiliary protocol which are further inserted in above-mentioned frames of the protocol complying with the DECT standard and, in the receiving radio part, and reading the frames of the auxiliary protocol from the received frames complying with the DECT standard and the signaling information is read from the frames of the auxiliary protocol.

24. A method for cordlessly connecting data terminal equipment (DTE) to data circuit terminating equipment (DCE) connected to a data terminal equipment (DTE) and a fixed radio part (FP) is connected to the data circuit terminating equipment (DCE) and in which data and signaling information and information related to automatic call setup are transmitted between the data terminal equipment (DTE) and portable radio part (PP) as well as between the data circuit terminating equipment (DCE) and fixed radio part (FP), wherein, in the transmitting radio part (PP, FP), the information transmitted between the portable (PP) and fixed (FP) radio parts is inserted in LAPU frames of DECT user plane C profile of the DECT standard and, in the receiving radio part (FP, PP), the information is read from said frames.

* * * * *